United States Patent
Lüthi et al.

(10) Patent No.: US 7,331,213 B2
(45) Date of Patent: Feb. 19, 2008

(54) SENSOR DEVICE FOR DETERMINING CONSTITUENTS OF A FLOWING MEDIUM

(75) Inventors: Yves Lüthi, Muri (CH); Ivan Zito, Baden (CH)

(73) Assignee: Siemens Schweiz AG, Zurich (CH)

( * ) Notice: Subject to any disclaimer, the term of this patent is extended or adjusted under 35 U.S.C. 154(b) by 40 days.

(21) Appl. No.: 11/196,119

(22) Filed: Aug. 3, 2005

(65) Prior Publication Data

US 2006/0027353 A1     Feb. 9, 2006

Related U.S. Application Data

(60) Provisional application No. 60/617,035, filed on Oct. 12, 2004.

(30) Foreign Application Priority Data

Aug. 3, 2004    (EP) ................................. 04103729

(51) Int. Cl.
*G01N 1/20* (2006.01)
*G01N 1/22* (2006.01)
(52) U.S. Cl. ................. 73/23.2; 73/863.41; 73/863.51; 73/863.57; 73/863.71
(58) Field of Classification Search ............ 73/23.2, 73/28.01, 28.04, 863.41, 863.51, 863.57, 73/863.71
See application file for complete search history.

(56) References Cited

U.S. PATENT DOCUMENTS

| | | | |
|---|---|---|---|
| 4,339,318 A | 7/1982 | Tanaka et al. | |
| 4,736,618 A | 4/1988 | Usami et al. | |
| 4,875,990 A | * 10/1989 | Kodachi et al. | ............ 204/408 |
| 6,015,533 A | 1/2000 | Adams et al. | |

FOREIGN PATENT DOCUMENTS

| | | |
|---|---|---|
| DE | 195 16 974 A | 10/1995 |
| DE | 44 30 378 A | 2/1996 |
| DE | 196 42 146 A | 5/1997 |
| DE | 196 28 423 C | 9/1997 |
| EP | 0259093 A | 3/1988 |

OTHER PUBLICATIONS

"CO2/VOC Sensors QPA63." *Siemens Building Technologies HVAC Products.* No. CMIN1958E. Dec. 2002. (10 Pages).

* cited by examiner

*Primary Examiner*—Daniel S. Larkin
(74) *Attorney, Agent, or Firm*—Maginot, Moore & Beck

(57) ABSTRACT

A device has at least one sensor for determining one or more constituents of a medium flowing in an installation duct. The device has a housing and a main channel, which is connected to said housing and is closed at an end remote from the housing. The main channel has a first channel and a second channel, which is separated from the first channel by a first separating wall. The main channel also has at least one first opening, which is away from the end and creates a first connection between the first channel and the installation duct, and at least one second opening, which is away from the end and creates a second connection between the second channel and the installation duct, so that the medium flows between the openings, through the channels and past the sensor.

12 Claims, 2 Drawing Sheets

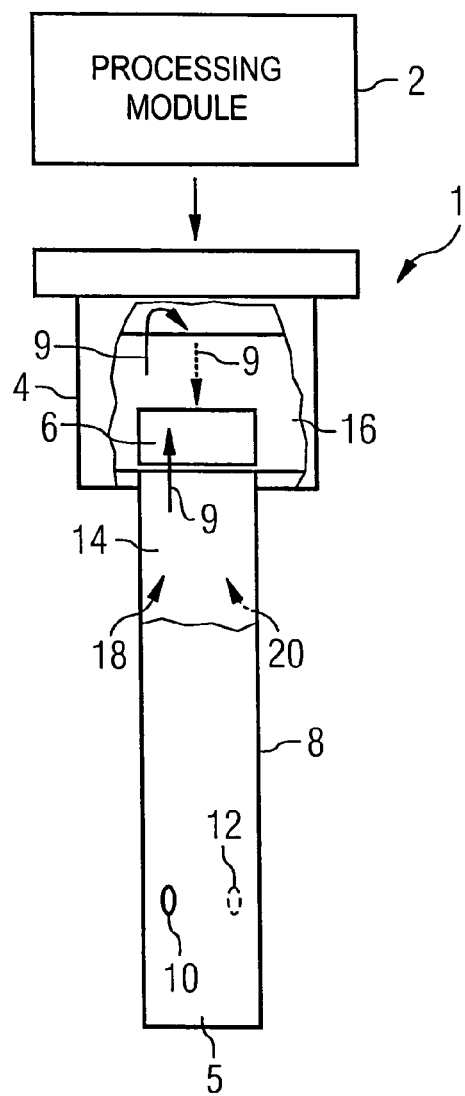
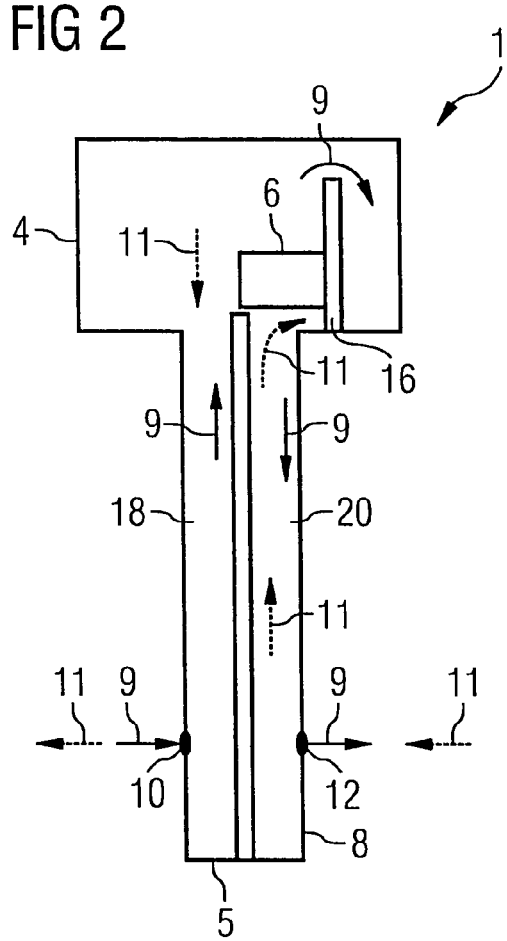

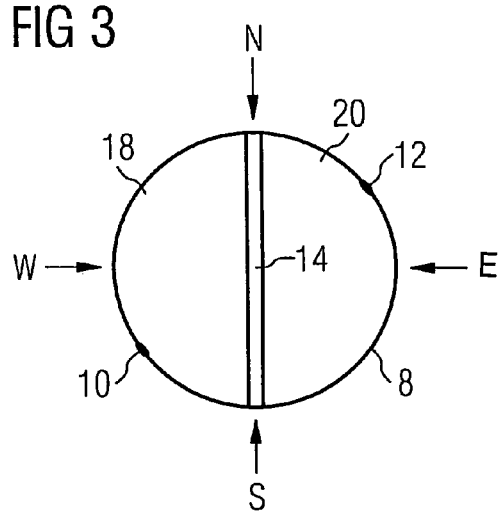
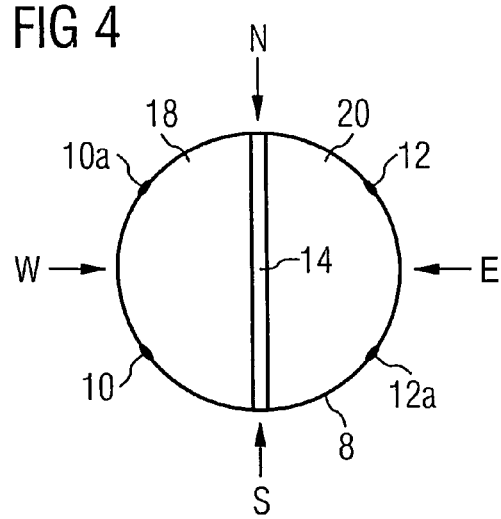
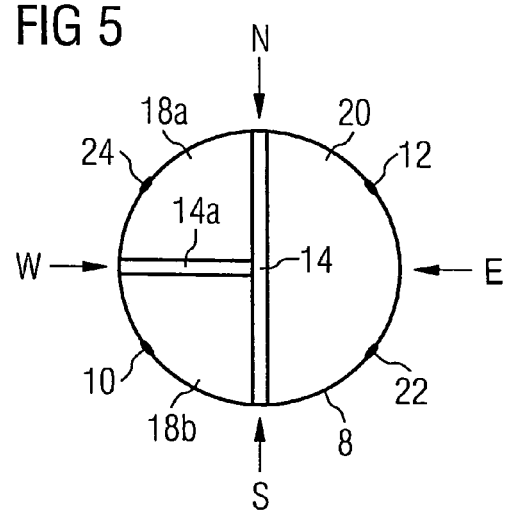

SENSOR DEVICE FOR DETERMINING CONSTITUENTS OF A FLOWING MEDIUM

This application claims the benefit of U.S. Provisional Patent Application Ser. No. 60/617,035 filed Oct. 12, 2004, and European Patent Application No. EP04103729, filed Aug. 3, 2004.

The exemplary embodiments described below relate to a device with a sensor for determining one or more constituents of a flowing medium.

Sensors are known in many different forms and are used in many different applications. For example, gas sensors are used in danger warning systems and heating, ventilation and air-conditioning systems. The product description "$CO_2$/VOC sensors QPA63 . . . " from Siemens Building Technologies AG, document number CM1N1958E of Dec. 5, 2002, describes $CO_2$ and VOC sensors (VOC: volatile organic compounds) for determining the quality of air in rooms and in ventilation ducts. These sensors are accommodated in a housing which can be mounted on an interior wall to determine the quality of the air in a room. This housing has at least one opening through which the air reaches the interior of the housing.

For determining the quality of the air in a ventilation duct, the housing must be extended with a tube, which protrudes into the ventilation duct. The tube feeds the air flowing in the ventilation duct through an opening to the sensors arranged in the housing for measurement. For this purpose, the tube has an inflow channel, which conducts the air from the ventilation duct into the interior of the housing, and an outflow channel, which conducts the air away from the interior of the housing into the ventilation duct. The inflow channel and the outflow channel are separated by a separating wall. At an end remote from the housing, the tube is closed. However, near the closed end, the tube wall has three openings arranged one above the other, so that the air can flow into the inflow channel. At the same end of the tube, the outflow channel has a wedge-shaped opening, through which air can escape out of the outflow channel back into the ventilation duct. The wedge-shaped opening reaches to the end of the tube.

The cited product description suggests for the measurement in a ventilation duct that the sensor with the fitted tube should be aligned such that the openings of the inflow channel are directed counter to the air flow. The air flowing onto the tube can therefore flow through the openings into the inflow channel. Under some circumstances, this mounting instruction may be restrictive and require increased time to be expended.

One aspect of the exemplary embodiments described below therefore relates to a device with a sensor which provides greater flexibility in the alignment with respect to the flow in a duct. Such a device has at least one sensor for determining one or more constituents of a medium flowing in an installation duct. The device has a housing and a main channel, which is connected to said housing and closed at an end remote from it. The main channel has a first channel and a second channel, which is separated from the first channel by a first separating wall. The main channel also has at least one first opening, which is away from the end and creates a first connection between the first channel and the installation duct, and at least one second opening, which is away from the end and creates a second connection between the second channel and the installation duct, so that the medium flows between the openings, through the channels and past the sensor.

These and other aspects, advantages and novel features of the exemplary embodiments described below are explained in the detailed description which follows with reference to the drawings. In the drawings, the same elements have the same designations.

FIG. 1 schematically shows a construction of a device by way of example, with a sensor for determining one or more constituents of a flowing medium, FIG. 2 illustrates flow paths through the device according to FIG. 1, given by way of example, FIG. 3 schematically shows a cross section through a first exemplary embodiment of a main channel of the device, FIG. 4 schematically shows a cross section through a second exemplary embodiment of a main channel of the device, and FIG. 5 schematically shows a cross section through a third exemplary embodiment of a main channel of the device.

The description of various exemplary embodiments of a device with a sensor for determining a constituent of a flowing medium is given below with reference to a gas sensor and an application in heating, ventilation and air-conditioning systems. A person skilled in the art will appreciate however that the features of the device can be used generally in any system in which a flowing medium (gaseous or liquid) is to be directed onto a sensor, such as for example in a combustion plant, a chemical process plant or a water treatment plant.

FIG. 1 schematically shows a construction of a device 1, given by way of example, with a sensor 6 for determining one or more constituents of a medium flowing in an installation duct. Depending on the application, the installation duct may be part of a heating, ventilation and air-conditioning system, a combustion plant, a chemical process plant or a water treatment plant. In one exemplary embodiment, the medium is gaseous and the sensor 6 is a gas sensor. As indicated in FIG. 1, a module 2, which serves inter alia for the processing of signals which are generated by the device 1, may be fastened to the device 1.

The device 1 has a housing 4 and a main channel 8 connected to it. At an end 5 remote from the housing 4, the main channel 8 is closed. The main channel 8 has a first channel 18 and a second channel 20, which is separated from the first channel 18 by a separating wall 14. The main channel 8 also has at least one opening 10, which is away from the end 5 and creates a connection between the channel 18 and the installation duct, and at least one opening 12, which is away from the end 5 and creates a connection between the channel 20 and the installation duct. As explained below, the medium consequently flows between the openings 10, 12, through the channels 18, 20 and past the sensor 6.

In one exemplary embodiment, the main channel 8 is a tube, which has for example, a diameter of about 10 mm to about 20 mm, and for example a length of about 5 cm to about 30 cm. A person skilled in the art will appreciate however that these dimensions are chosen according to the application, and that the dimensions chosen on this basis may deviate from the values stated for the diameter and the length. In addition, a person skilled in the art appreciates that the main channel 8 does not necessarily have to take the form of a tube. In general, the main channel 8 may take the form of a hollow body which extends along a longitudinal axis. Such a hollow body may have a circular cross section or some other cross section. Furthermore, depending on the application area, the longitudinal axis may be straight or curved.

For better understanding, in FIG. 1 the housing 4 and the main channel 8 are shown with broken-out side parts, so that the sensor 6 and the separating wall 14 can be seen. In the exemplary embodiment shown, the sensor 6 is fastened on a printed circuit board 16, which can likewise be seen. On the printed circuit board 16 there are additional electronic circuits, which however are not represented in FIG. 1. Furthermore, a flow path, indicated by arrows 9, is indicated by way of example. In an inflow direction, the flow path leads from the channel 18 past the sensor 6 and past a front side of the printed circuit board 16. In an outflow direction, the flow path leads past a rear side of the printed circuit board 16 into the channel 20 and out of the channel 20.

The housing 4 is closed and sealed in a gastight manner. This means, inter alia, that cable bushings that are present are correspondingly sealed, in order to achieve meaningful measurements by the sensor 6. In an exemplary embodiment, the housing 4 is closed on a side opposite from the main channel 8 by a printed circuit board inserted with an exact fit and a seal. In one exemplary embodiment, this printed circuit board represents the electrical connection to the module 2 shown in FIG. 1.

While the gaseous medium, for example air, a gas ($CO_2$, CO, NO, etc.) or a gas-air mixture, is flowing past the sensor 6, an interaction with the medium occurs at the sensor 6. On the basis of the interaction, the sensor 6 generates a signal, which the module 2 for example processes further.

In one exemplary embodiment, the sensor 6 is a gas sensor. In one exemplary embodiment, the gas sensor may be a photoacoustic gas sensor, which is described for example in DE 19516974 and serves for determining whether, for example, $CO_2$, CO or NO are present in a room. The gas sensor has a measuring chamber, in which the medium to be determined is located. A control device controls a light source, in order to excite periodically gas molecules present in the measuring chamber. A microphone detects the pressure fluctuations emanating from the gas molecules and generates an electric signal, which indicates whether a specific gas is present and possibly its level of concentration. A monitoring and controlling device connected to the sensor 6 uses this signal to check the operation of the heating, ventilation or air conditioning system and possibly control it correspondingly.

FIG. 2 illustrates by way of example the flow path already indicated in FIG. 1 within the device 1 in a side view. As mentioned, the side wall 14 separates the channel 18 and the channel 20. The arrows 9 indicate the flow path which is produced when the medium enters the channel 18 through the opening 10 and then flows past the sensor 6 and the printed circuit board 16, in order subsequently to leave through the channel 20 and the opening 12.

The flow path within the device 1 is reversible. Arrows 11 indicate a second flow path, which is counter to the first flow path indicated by the arrows 9. The second flow path is produced when the medium enters the channel 20 through the opening 12 and leaves from the opening 10.

Structural measures within the housing 4 contribute to achieving the desired flow path past the sensor 6. As indicated in FIG. 2, the sensor 6 is positioned in such a way that a front side of the sensor 6 terminates approximately with a plane of the separating wall 14. Furthermore, the front side is positioned close to one end of the separating wall 14 and in one exemplary embodiment may touch the end. In addition, there may be rails, grooves and elevations, to position the sensor 6 and the printed circuit board 16. As a result, the desired flow path can be achieved and undesired flow paths within the housing 4 can be reduced or avoided entirely.

As an alternative to the exemplary embodiment shown in FIGS. 1 and 2, the sensor 6 may also be positioned on the housing wall opposite from the tube 8. In this case, the medium carried in the first channel 18 impinges on the sensor 6 approximately perpendicularly for example, in order then to be conducted away by the negative pressure prevailing in the second channel 20.

FIG. 3 schematically shows a cross section through an exemplary embodiment of a main channel 8 of the device 1 at the level of the openings 10, 12. The separating wall 14 separates the two channels 18, 20. The openings 10, 12 are arranged unsymmetrically with respect to the separating wall 14.

In the exemplary embodiment shown in FIG. 3, the main channel 8 is a tube with a circular cross section. In general, however, a tube with a non-circular cross section may also be used. In the exemplary embodiment shown, the openings 10, 12 are also at the same level and are approximately 10 mm to 40 mm away from the end of the tube. The openings 10, 12 may, however, also be at different levels. Furthermore, in the exemplary embodiment shown, the separating wall 14 separates the channels 18, 20 into channels of about the same size. In another exemplary embodiment, the channels 18, 20 may, however, also be channels of different sizes.

In an exemplary embodiment, each opening 10, 12 is a circular opening with a diameter of about 1 to about 5 mm. As an alternative to this, the openings 10, 12 may be formed for example as ovals, as slits (for example transversely to the longitudinal axis of the tube 8) or as a number of adjacent openings. In the latter case, a group of adjacent (for example small) openings forms one or both of the openings 10, 12. A combination of different configurations of the openings is also possible. For example, the openings 10, 12 may be formed as circular openings of different diameters. Furthermore, for example, the opening 10 may be formed as a circular opening, and the opening 12 as a slit.

In one exemplary embodiment, the housing 4 and the main channel 8 are in one piece. Conventional production processes may be used for production, for example a casting or injection-molding process. The material for the housing 4 and the main channel 8 may in principle be any material suitable for these processes, for example plastic or plastic-like materials, such as for example ABS (acrylonitrile butadiene styrene), PPS (polyphenylene sulfide), PVC, PP (polypropylene), PE (polyethylene) or the like. The material may also be chosen such that a rigid or flexible main channel 8 is obtained. In another exemplary embodiment, the housing 4 and the main channel 8 may be separate parts which are produced from the same or different materials (for example metal).

FIG. 3 additionally shows the four points of the compass N, S, W, E, in order to explain the low directional dependence of the device 1. For the following theoretical explanations (and also with reference to FIGS. 4 and 5), it is assumed that the main channel 8 is fixed and the direction of flow changes, as considered from the main channel 8. A person skilled in the art appreciates, however, that in practice the alignment of the main channel 8 is variable because, for example, the main channel 8 is turned while it is being fitted, while the direction of flow is fixed by the installation or ventilation duct and generally does not change.

If the flow is coming from the North, East or a direction in between (N-E), a higher pressure prevails at the opening 12 than at the opening 10 and the medium flows through the opening 12 into the channel 20. If the flow is coming from the South, West or a direction in between, a higher pressure prevails at the opening 10 than at the opening 12 and the medium flows through the opening 10 into the channel 18.

If the flow is coming from the South-East or North-West directions, a changeover of the pressure conditions occurs. The higher pressure at the opening 12 also prevails in the South-East direction until there is a change to the South direction and the pressure becomes higher at the opening 10. The medium then flows through the opening 10 into the channel 18. A similar situation applies if the flow coming from the North changes to the West. The higher pressure at the opening 12 still also prevails in the North-West direction until there is a change to the West direction and the pressure at the opening 10 becomes higher. The medium then flows through the opening 10 into the channel 18. The described arrangement of the openings 10, 12 plays a part in making it unnecessary any longer for the device 1 to be exactly aligned with regard to the flow in an installation or ventilation duct. In a wide angular range, the device 1 is independent of how the main channel 8 is aligned in the installation or ventilation duct.

FIG. 4 schematically shows a cross section through a second exemplary embodiment of a main channel 8 of the device 1. In addition to the features already shown in FIG. 3 and explained, the main channel 8 according to FIG. 4 has two additional openings 10*a*, 12*a*. The openings 10, 10*a* create a connection between the channel 18 and the installation duct, and the openings 12, 12*a* create a connection between the channel 20 and the installation duct. In the exemplary embodiment shown, the openings 10, 10*a* are at approximately the same level but away from each other by a predetermined distance. This also applies to the openings 12, 12*a*. In this exemplary embodiment, the openings 10, 10*a*, 12, 12*a* are mirror-symmetrical in relation to the separating wall 14.

The flow path in FIG. 4 is similar to that in FIG. 3, so that the explanations regarding FIG. 3 also apply in principle to FIG. 4. The additional opening 10*a*, 12*a* for each channel 18, 20 optimizes the function of the device 1 for the case in which the flow comes from the South-East or North-West.

FIG. 5 schematically shows a cross section through the main channel 8 according to a further exemplary embodiment. As in FIG. 3, the separating wall 14 separates off the second channel 20. An additional separating wall 14*a* divides the first channel into a subchannel 18*a* and a subchannel 18*b*. Therefore, there are altogether three channels 18*a*, 18*b*, 20 in the main channel 8. Considered from the installation or ventilation duct, the opening 10 leads into the subchannel 18*b*, the opening 24 leads into the subchannel 18*a*, and the openings 12, 22 lead into the channel 20.

In the same way as shown in FIG. 2, the main channel 8 according to the exemplary embodiment that is shown in FIG. 5 protrudes from the housing 4. In one exemplary embodiment, the sensor 6 is arranged within the housing 4 in a way similar to that shown in FIG. 2. The flow therefore likewise flows past the sensor 6, so that the sensor-medium interaction can take place. In the inflow direction, the flow impinges on the sensor 6 as it comes from at least one of the channels 18*a*, 18*b*, 20. FIG. 5 likewise shows the four points of the compass N, S, W, E, in order to explain the low directional dependence of the device 1. If the flow is coming from the North, a higher pressure prevails at the openings 12, 24 than at the openings 10, 22, and the medium flows through the opening 12 into the channel 20 and through the opening 24 into the subchannel 18*a*. The medium flows away through the subchannel 18*b*. If the direction of flow changes in its path from North to South, the pressure conditions change, so that initially the pressure is greatest at the opening 12, then at the two openings 12, 22 and finally at the opening 22. Under these pressure conditions, the medium flows through the channel 20 in the direction of the sensor 6. The medium flows away substantially through both subchannels 18*a*, 18*b*.

If the flow is coming from the South, a higher pressure prevails at the openings 10, 22 than at the openings 12, 24, and the medium flows through the opening 10 into the subchannel 18*b* and through the opening 22 into the channel 20. The medium flows away through the subchannel 18*a*. If the direction of flow changes in its path from South to North, the pressure conditions change, so that initially the pressure is greatest at the opening 10, then at the two openings 10, 24 and finally at the opening 24. Under these pressure conditions, the medium initially flows through the subchannel 18*b* in the direction of the sensor 6, then through both subchannels 18*a*, 18*b* and finally through the subchannel 18*a*. The medium flows away substantially through the channel 20.

The pressure conditions explained can be optimized experimentally. For example, the shape, size, or a combination of shape and size, of the openings 10, 10*a*, 12, 12*a*, 22, 24 can be adapted to cover a specific angular range.

What is claimed is:

1. A device with at least one sensor for determining one or more constituents of a medium flowing in an installation duct, the device including a housing and a main channel connected to said housing, the main channel closed at an end remote from the housing and has a first channel and a second channel separated from the first channel by a first separating wall, the main channel having at least one first opening, which is away from the end and creates a first connection between the first channel and the installation duct, and at least one second opening, which is away from the end and creates a second connection between the second channel and the installation duct, so that the medium flows between the openings, through the channels and past the sensor, characterized by:
   a second separating wall separating the first channel into a first subchannel and a second subchannel,
   wherein each subchannel is in communication with an opening, and each subchannel opening creating a connection between the respective subchannel and the installation duct.

2. The device as claimed in claim 1, the first and second openings being arranged unsymmetrically with respect to the separating wall.

3. The device as claimed in claim 2, wherein the first and second channels are of substantially the same size.

4. The device as claimed in claim 1, wherein the first and second channels are of substantially the same size.

5. The device as claimed in claim 1, wherein the subchannels are of substantially the same size.

6. The device as claimed in claim 1, wherein the subchannels are of substantially the same size.

7. The device as claimed in claim 6, wherein the second channel includes two openings.

8. The device as claimed in claim 1, wherein the second channel includes two openings.

9. The device as claimed in claim 1, wherein the main channel includes a third opening, which is away from the end and creates a second connection between the first channel and the installation duct, and a fourth opening, which is away from the end and creates a second connection between the second channel and the installation duct.

10. The device as claimed in claim 9, wherein each of the first, second, third and fourth openings have a shape from one of the group consisting of circular, oval and slit-shaped.

11. The device as claimed in claim 9, wherein each of the first and second openings have a shape from one of the group consisting of circular, oval and slit-shaped.

12. The device as claimed in claim 9, wherein the first and second openings are equidistant from the end.

* * * * *